United States Patent [19]

Manga

[11] Patent Number: 4,779,196
[45] Date of Patent: Oct. 18, 1988

[54] INTERFACE DEVICE FOR CONTROLLING COMMAND AND DATA TRANSFER BETWEEN A HOST COMPUTER AND A DISK CONTROLLER

[75] Inventor: Salih Manga, Schwieberdingen, Fed. Rep. of Germany

[73] Assignee: Alcatel N.V., Amsterdam, Netherlands

[21] Appl. No.: 831,695

[22] Filed: Feb. 21, 1986

[30] Foreign Application Priority Data

Mar. 7, 1985 [DE] Fed. Rep. of Germany ....... 3508048

[51] Int. Cl.[4] .............................................. G06F 3/00
[52] U.S. Cl. .................................................. 364/200
[58] Field of Search ... 364/200 MS File, 900 MS File, 364/200

[56] References Cited

U.S. PATENT DOCUMENTS

| | | | |
|---|---|---|---|
| 3,810,105 | 5/1974 | England | 364/200 |
| 4,158,228 | 6/1979 | Olander, Jr. et al. | 364/200 |
| 4,258,418 | 3/1981 | Heath | 364/200 |
| 4,356,550 | 10/1982 | Katzman et al. | 364/200 |
| 4,380,047 | 4/1983 | Eisenhard et al. | 364/200 |
| 4,433,377 | 2/1984 | Eustis et al. | 364/200 |
| 4,464,718 | 8/1984 | Dixon et al. | 364/200 |
| 4,500,958 | 2/1985 | Manton et al. | 364/200 |
| 4,535,404 | 8/1985 | Shenk | 364/200 |
| 4,543,628 | 9/1985 | Pomfret | 364/200 |
| 4,716,523 | 12/1987 | Burrus, Jr. et al. | 364/200 |

*Primary Examiner*—Raulfe B. Zache
*Assistant Examiner*—Eric Coleman
*Attorney, Agent, or Firm*—Spencer & Frank

[57] ABSTRACT

To control the transfer of commands and data, an interface device is connected to a host computer by a first data bus, an address bus, and first control-signal lines, and to a disk controller by a second data bus and second, third, and fourth control-signal lines. The interface device includes a first internal bus and a second internal bus interconnected via a first controllable buffer and a second controllable buffer, with the first data bus connected to the second internal bus through a third controllable buffer, and the second data bus to the first internal bus through a fourth controllable buffer. An interface controller is connected to the address bus and to the first, second, and third control-signal lines and, via internal control-signal lines, to the controllable buffers. The third and fourth control-signal lines and an error-signal line are connected to the second internal bus via a fifth controllable buffer.

15 Claims, 2 Drawing Sheets

INTERFACE DEVICE FOR CONTROLLING COMMAND AND DATA TRANSFER BETWEEN A HOST COMPUTER AND A DISK CONTROLLER

BACKGROUND OF THE INVENTION

The present invention relates to an interface device for controlling the command and data transfer between a host computer and a disk controller, the host computer comprising a first data bus, an address bus, and first control-signal lines, and the disk controller comprising a second data bus and second, third, and fourth control-signal lines.

Common means of storing large amounts of data are disk storages and/or floppy disks which are accessed via a disk controller. Such disk controllers (e.g., DTC 510A/510B of Data Technology Corporation) have a data bus and control-signal lines but no address bus. Thus, command and data transfer between a conventional host computer, having a data bus, an address bus, and control-signal lines, and a disk controller of the above kind is impossible for lack of addressing capability. The technical problem to be solved by an interface device in accordance with the invention is to control such a command and data transfer.

SUMMARY OF THE INVENTION

The interface device in accordance with the invention is characterized in that it contains a first internal bus and a second internal bus which are interconnected via a first controllable buffer for the first direction of transfer and via a second controllable buffer for the second direction of transfer, that a first check-bit generator and a second check-bit generator are coupled to the first internal bus, that the first data bus is connected to the second internal bus via a third controllable buffer, that the second data bus is connected to the first internal bus via a fourth controllable buffer, that the address bus and the first, second, and third control-signal lines are connected to an interface controller, that the third and fourth control-signal lines and an error-signal line connected to an output of the second check-bit generator and serving to transfer a status word indicating the respective status of the disk controller are connected to the second internal bus via a fifth controllable buffer, that the first and second check-bit generators are connected to a sixth controllable buffer linked to the disk controller by a check-bit line, and that the interface controller is connected to the controllable buffers by internal control-signal lines.

BRIEF DESCRIPTION OF THE DRAWING

An embodiment of the invention will now be explained with reference to the accompanying drawings, in which.

DESCRIPTION OF THE PREFERRED EMBODIMENT

The interface device in accordance with the present invention serves to control the command and data transfer between a host computer DMPC, connected to the interface device by a first data bus PDAT 00-07, an address bus PADR 00-07, and first control-signal lines SSL1, and a disk controller DC, connected to the interface device by a second data bus WDAT 00-07 and by second, third and fourth control-signal lines SSL2, SSL3, and SSL4. The disk controller controls the access to disk storages and/or floppy disks (not shown).

Figure 1:
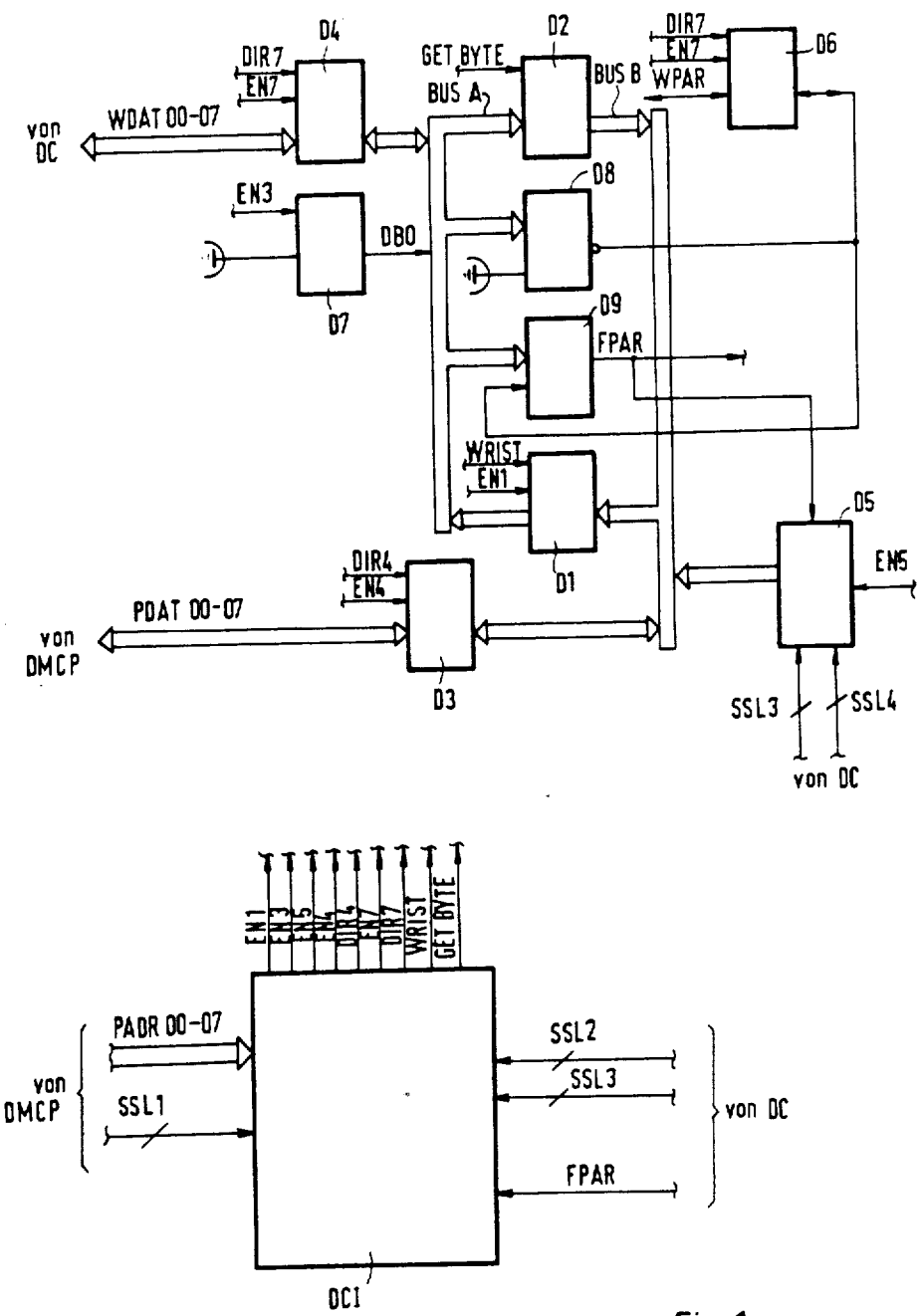
FIG. 1 is a block diagram of the interface device in accordance with the invention.

The interface device (FIG. 1) has a first internal bus BUS A and a second internal bus BUS B, which are interconnected via a first controllable buffer D1 for the first direction of transfer and via a second controllable buffer D2 for the second direction of transfer. Also coupled to the first internal bus BUS A are a first check-bit generator D8 and a second check-bit generator D9.

The first data bus PDAT 00-07 (coming from the host computer DMCP) is connected to the second internal bus BUS B via a third controllable buffer D3, and the second data bus WDAT 00-07 (from the disk controller DC) to the first internal bus BUS A via a fourth controllable buffer D4.

For the transfer of addresses and control signals, the address bus PADR 00-07, the first control-signal line SSL1 (both coming from the host computer DMCP), and the second and third control-signal lines SSL2, SSL3 (both coming from the disk controller DC) are connected to an interface controller DCI. The latter is connected to the controllable buffers by internal control-signal lines.

For the transfer of a status word (STATUS BYTE) indicating the respective condition of the disk controller DC, the third and fourth control-signal lines SSL3, SSL4 and an error-signal line FPAR, which is connected to the output of the second check-bit generator D9, are connected to the second internal BUS B via a fifth controllable buffer D5.

The first and second check-bit generators D8, D9 are also coupled to a sixth controllable buffer D6, which is connected to the disk controller DC by a check-bit line WPAR.

A seventh controllable buffer D7 is connected to a fixed potential and to the least significant bit line DB0 of the first internal BUS A. Over an additional internal control-signal line EN3, the seventh buffer D7 is controlled in such a way that the least significant bit line DB0 is tied to a logic level representing the fixed potential.

In the embodiment being described, the first control-signal lines SSL1 consist of
   a write-enable-signal line PWR
   a read-enable-signal line PRD
   a first select-signal line PSEL
   an interrupt-signal line PINTO
   a first request-signal line PREQ1
   a first reset-signal line PRES;
the second control-signal lines SSL2 of
   a second select-signal line WSEL
   a second reset-signal line WRST
   an acknowledge-signal line WACK;
the third control-signal lines SSL3 of
   a busy-signal line WBUSY
   a command-acknowledge-signal line WMSG,
and the fourth control-signal lines SSL4 of
   an input/output signal line WI/O
   a command/data signal line WC/D
   a second request-signal line WREQ.

Figure 2:
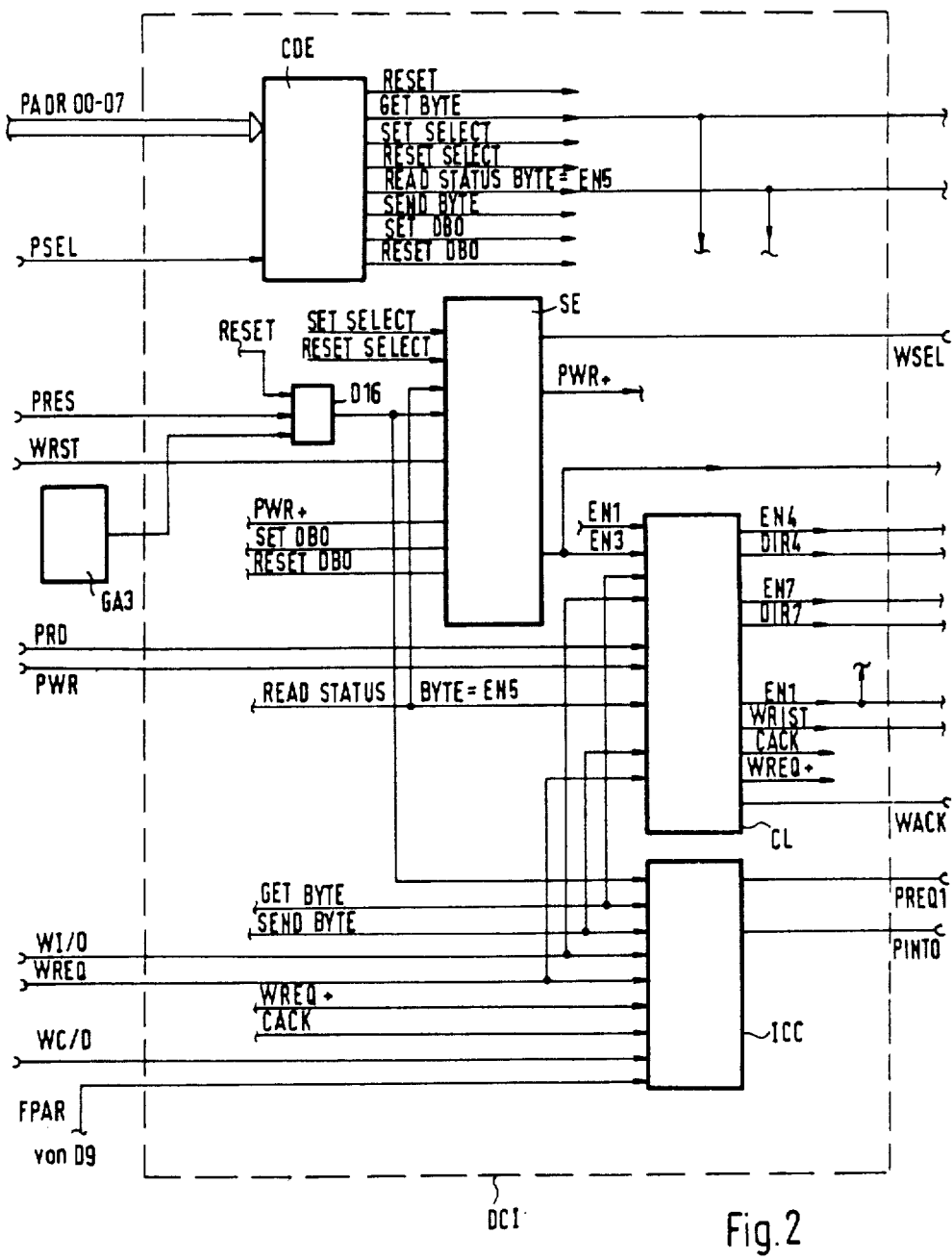
FIG. 2 is a detailed block diagram of the interface controller of FIG. 1.

As can be seen in the detailed block diagram of FIG. 2, the interface controller DCI contains a command decoder CDE, a select logic SE, an interrupt and DMA controller—henceforth called "DMA unit"—ICC, and a control logic CL.

The command decoder CDE is connected to the host computer DMCP by the address bus PADR 00-07 and the first selectsignal line PSEL, and converts the applied addresses into corresponding commands. These commands are transferred over a first command line RESET, a second command line SET SELECT, a third command line RESET SELECT, a fourth command line SET DBO, and a fifth command line RESET DBO to the select logic SE, over a sixth command line READ STATUS BYTE=EN5 both to the select logic SE and to the control logic CL, and over a seventh command line GET BYTE and an eighth command line SEND BYTE both to the control logic CL and to the DMA unit ICC. The sixth command line READ STATUS BYTE=EN5 and the seventh command line GET BYTE double as internal control-signal lines which are connected to the fifth controllable buffer D5 and the second controllable buffer D2, respectively.

The first command line RESET is not connected directly to the select logic SE but coupled, together with the first reset-signal line PRES and an internal reset circuit GA3, to a logic gate D16, which passes the reset signals to the control logic SE one at a time.

The select logic SE is also connected to the disk controller DC by the second reset-signal line WRST and the second select-signal line WSEL. An output of the select logic SE is coupled back to an input of the select logic SE via a ninth command line PWR. A tenth command line EN3 connects another output of the select logic SE both to the control logic CL and—as an additional internal control-signal line—to the seventh controllable buffer D7.

The DMA unit ICC is connected to the host computer DMCP by the first request-signal line PREQ1, the interruptsignal line PINTO, and the first reset signal line PRES, and to the disk controller DC by the second request-signal line WREQ, the input/output signal line WI/O, and the command/data signal line WC/D. The second check-bit generator D9 is connected to the DMA unit ICC by the error-signal line FPAR.

The control logic is connected to the host computer DMCP by the write-enable-signal line PWR and the read-enable-signal line PRD. An output of the control logic CL is coupled back to an input of the control logic CL via an eleventh command line EN1. Via a twelfth command line CACK and a thirteenth command line WREQ+, the control logic C is connected to the DMA unit ICC. The eleventh command line EN1 and first, second, third, fourth, and fifth logic-signal lines EN4, DIR4, EN7, DIR7, and WRIST, which are connected to outputs of the control logic CL, form internal controlsignal lines. The eleventh command line EN1 and the fifth logic-signal line WRIST are connected to the first controllable buffer D1, the first and second logic-signal lines EN4, DIR4 to the third controllable buffer D3, and the third and fourth logic-signal lines EN7, DIR7 both to the fourth controllable buffer D4 and to the sixth controllable buffer D6.

The control of the command and data transfer by the interface device in accordance with the invention will now be explained with the aid of the following functions:
  resetting of the disk controller DC
  occupying the disk controller DC
  reading a status word (STATUS BYTE) indicating the condition of the disk controller DC
  command/data transfer between the host computer DMCP and the disk controller DC.

By addressing the address bus PADR 00-07, the host computer DMCP causes the command decoder CDE to decode a reset command, which is transferred over the first command line RESET and through the logic gate D16 to the select logic SE. In addition, a reset command can be sent from the host computer DMCP over the first reset-signal line PRES or from the internal reset circuit GA3 to the logic gate D16 and from there to the select logic SE. The select logic SE is connected to the disk controller DC by the second reset-signal line WRST, over which it can be restored to a defined initial state. At the same time, the DMA unit ICC, which is connected to the output of the logic gate D16, is reset.

To occupy the disk controller DC, the following operation steps have to be taken. First, the least significant bit line DBO of the second data bus WDAT 00-07 is activated (low level). To do this, the host computer DMCP sends a set command for the least significant bit line DBO over the address bus PADR 00-07 to the command decoder CDE, which transfers the decoded command over the fourth command line SET DBO to the select logic SE. The select logic SE thus activates the tenth command line EN3 ("low level" if the ninth command line PWR+ has been activated, too) and, via the seventh controllable buffer D7, the least significant bit line DBO of the first internal bus BUS A.

At the same time, the control logic CL is activated via the tenth command line EN3 so that the third and fourth logic-signal lines EN7, DIR7 are activated, too. Thus, the fourth controllable buffer D4 is activated and the level applied from the least significant bit line DBO of the first internal bus BUS A is switched to the second data bus WDAT 00-07. The least significant bit line DBO of the second data bus WDA1 00-07 remains activated ("low level") until it is reset by the host computer DMCP.

In the next step, the second select-signal line WSEL is activated. As in the step just described, the host computer DMCP sends a set command over the address bus PADR 00-07 to the command decoder CDE, which transfers the decoded command over the second command line SET SELECT to the select logic SE. The latter then activates the second select-signal line WSEL ("low level"), thereby occupying the disk controller DC.

As a further operation, a status word (STATUS BYTE) indicating the condition of the disk controller DC is read by the host computer DMCP. The latter sends a read command over the address bus PADR 00-07 to the command decoder CDE, which transfers the decoded command over the sixth command line READ STATUS BYTE=EN5 ("low level") both to the control logic CL and to the fifth controllable buffer D5. Into the status word (STATUS BYTE) stored in this buffer, the following information is entered via the signal lines connected to this buffer:
  status word:
    bit 0—busy signal (WBUSY)
    bit 1—input/output signal (WI/O)
    bit 2—command/data signal (WC/D)
    bit 3—command acknowledge signal (WMSG)
    bit 4—error signal (FPAR)
    bit 5—second request signal (WREQ)
    bit 6—
    bit 7—tied to "low level" during operation,
which is read from the fifth controllable buffer D5 (in response to the command on EN5) and placed on the second internal BUS B. At the same time, the control logic CL controls the third controllable buffer D3 over the first and second logic-signal lines EN4, DIR4 in such a way that the status word (STATUS BYTE) is placed on the first data bus PDAT 00-07 and, thus, transferred to the host computer DMCP. After the host computer DMCP has read the status word (STATUS BYTE) and has received a signal indicating that the disk controller DC has been occupied (BIT 0=WBUSY), it sends a reset command for the second selectsignal line WSEL over the address bus PADR 00-07 to the command decoder CDE, which transfers the decoded command over the third command line RESET SELECT to the select logic SE. The latter deactivates the second select-signal line WSEL.

The host computer DMCP then sends a reset command for the least significant bit line DBO of the second data bus WDAT 00-07 over the address bus PADR 00-07, the command decoder CDE, and the fifth command line RESET DBO to the select logic SE. The latter resets the tenth command line EN3 and, via the control logic CL, the third and fourth logic-signal lines EN7, DIR7, with the seventh controllable buffer D7 (in response to the signal on EN3) and the fourth controllable buffer D4 (in response to the signals on EN7 and DIR7) deactivating the least significant bit lines DBO of the first internal bus BUS A and the second data bus WDAT 00-07, respectively.

For the transfer of a word (BYTE) between the host computer DMCP and the disk controller DC, the respective transfer direction must be specified by commands.

For the first direction of transfer, the host computer DMCP sends a word write command (SEND BYTE) over the address bus PADR 00-07 to the command decoder CDE, which transfers the decoded command over the eighth command line (SEND BYTE) to both the DMA unit ICC and the control logic CL.

Word transfer is now effected by activating the first request-signal line PREQ1, which is set based on the levels of the thirteenth command line WREQ+, the input/output signal line WI/O, the command/data signal line WC/D, and the error-signal line FPAR. The first request-signal line PREQ1 remains set until the host computer DMCP has performed a write/read operation.

When the read-enable-signal line PWR and the eighth command line SEND BYTE are activated, the eleventh command line EN1 is set by the control logic C. As a result, the first, third, and fourth logic-signal lines EN4, EN7 and DIR 7 are activated by the control logic C.

As the write-enable-signal line PWR and the eighth command line SEND BYTE are active, the control logic CL simultaneously sets the twelfth command line CACK, so that the DMA unit ICC resets the first request-signal line PREQ1.

The word (BYTE) coming from the host computer DMCP is transferred over the first data bus PDAT 00-07 and through the third controllable buffer D3 to the second internal bus BUS B. On a leading edge of the signal on the fifth logic-signal line WRIST (activated by PRW, SEND BYT), it is entered into the first controllable buffer D1.

If the eleventh command line EN1 is active, the stored data word is then transferred over the first internal bus BUS A to the first check-bit generator D8, and through the fourth controllable buffer D4 (activated by EN7, DIR7) to the second data bus WDAT 00-07 and, thus, to the disk controller DC.

At the same time, the first check-bit generator D8 generates a check bit for the data word and sends it through the sixth buffer D6 (activated by EN7, DIR7) and over the check-bit line WPAR to the disk controller DC.

After the data word has been transferred into the disk controller DC, the latter resets the level of the second request-signal line WREQ, so that the level of the eleventh command line EN1 and, hence, the levels of the first, third, and fourth logic-signal lines EN4, EN7, and DIR7 are reset by the control logic CL.

For the second direction of transfer, the host computer DMCP sends a word read command (GET BYTE) over the address bus PADR 00-07 to the command decoder CDE, which transfers the decoded command over the seventh command line (GET BYRE) both to the DMA unit ICC and to the control logic CL.

For the word transfer, the first request-signal line PREQ1 is activated in response to the levels of the thirteenth command line WREQ+, the input/output signal line WI/O, the command/data signal line WC/D, and the error-signal line FPAR, as described above.

When the read-enable-signal line PDR and the seventh command line (GET BYTE) are active, the first and second logic-signal lines EN4, DIR4 and the third logic-signal line EN7 (through WI/O) are set by the control logic C.

Thus, the word coming from the disk controller DC is transferred over the second data bus WDAT 00-07 and through the fourth controllable buffer D4 (activated by EN7) to the first internal bus BUS A and stored both in the second controllable buffer D2 and in the second check-bit generator D9. If the seventh command line GET BYT is active, the stored word is then transferred over the second internal bus BUS B and through the third controllable buffer D3 (activated by EN4, DIR) to the first data bus PDAT 00-07 and, thus, to the host computer DMCP.

At the same time, the second check-bit generator D9 generates a check bit and places it on the error-signal line FPAR. In the event of a bit error, the DMA unit ICC sends an interrupt command over the interrupt-signal line PINTO to the host computer DMCP. By a reset command, the whole operation can thus be repeated as described.

As the read-enable-signal line PRD and the seventh command line GET BYTE are active, the control logic CL sets the twelfth command line CACK, so that the DMA unit ICC resets the first request-signal line PREQ1.

To ensure a correct transfer of words between the host computer DMCP and the disk controller DC, a signal indicating that the respective operation has been performed is sent to the disk controller DC.

As the write-enable-signal line PWR or the read-enable signal line PRD is activated when the eighth command line SEND BYTE or the seventh command line GET BYTE, respectively, is activated, the control logic CL sends an acknowledge signal over the acknowledge-signal line WACK to the disk controller DC. The acknowledge-signal line WACK remains set until the thirteenth command line WREQ+ is set. Activation of the second request-signal line WREQ permits the acknowledge-signal line WACK to be set in the next operation.

| List of Reference Characters | |
| --- | --- |
| Host computer | DMCP |
| Disk controller | DC |
| First data bus | PDAT 00–07 |
| Second data bus | WDAT 00–07 |
| Address bus | PADR 00–07 |
| First control-signal lines | SSL1 |
| Second control-signal lines | SSL2 |
| Third control-signal lines | SSL3 |
| Fourth control-signal lines | SSL4 |
| First internal bus | BUS A |
| Second internal bus | BUS B |
| First controllable buffer | D1 |
| Second controllable buffer | D2 |
| Third controllable buffer | D3 |
| Fourth controllable buffer | D4 |
| Fifth controllable buffer | D5 |
| Sixth controllable buffer | D6 |
| Seventh controllable buffer | D7 |
| First check-bit generator | D8 |
| Second check-bit generator | D9 |
| Interface controller | DCI |
| Error-signal line | FPAR |
| Check-bit line | WPAR |
| Write-enable-signal line | PWR |
| Read-enable-signal line | PRD |
| First select-signal line | PSEL |
| Interrupt-signal line | PINTO |
| First request-signal line | PREQ1 |
| First reset-signal line | PRES |
| Second select-signal line | WSEL |
| Second reset-signal line | WRST |
| Acknowledge-signal line | WACK |
| Busy-signal line | WBUSY |
| Command-acknowledge-signal line | WMSG |
| Input/output signal line | WI/O |
| Command/data signal line | WC/D |
| Second request-signal line | WREQ |
| Least significant bit line | BDO |
| Command decoder | CDE |
| Select logic | SE |
| Interrupt and DMA controller (DMA unit) | ICC |
| Control logic | CL |
| First command line | RESET |
| Second command line | SET SELECT |
| Third command line | RESET SELECT |
| Fourth command line | SET DBO |
| Fifth command line | RESET DBO |
| Sixth command line | READ STATUS BYTE = EN5 |
| Seventh command line | GET BYTE |
| Eighth command line | SEND BYTE |
| Ninth command line | PWR+ |
| Tenth command line | EN3 |
| Eleventh command line | EN1 |
| Twelfth command line | CACK |
| Thirteenth command line | WREQ+ |
| First logic-signal line | EN4 |
| Second logic-signal line | DIR4 |
| Third logic-signal line | EN7 |
| Fourth logic-signal line | DIR7 |
| Fifth logic-signal line | WRIST |
| Reset circuit | GA3 |
| Logic gate | D16 |

I claim:

1. Interface device for controlling the command and data transfer between a host computer and a disk controller, the host computer comprising a first data bus, an address bus, and first control-signal lines, and the disk controller comprising a second data bus and second, third, and fourth control-signal lines, characterized in that the interface device contains a first internal bus and a second internal bus which are interconnected via a first controlled buffer for a first direction of transfer and via a second controlled buffer for a second direction of transfer, that a first check-bit generator and a second check-bit generator are coupled to the first internal bus, that the first data bus is connected to the second internal bus via a third controlled buffer, that the second data bus is connected to the first internal bus via a fourth controlled buffer, that the address bus and the first, second, and third control-signal lines are connected to an interface controller, that the host computer is connected with the interface controller via the address bus and the first control-signal lines, that the disk controller is connected with the interface controller via the second and third control-signal lines, that to transfer a status word indicating the status of the disk controller the third and fourth control-signal lines from the disk controller are connected to the second internal bus via a fifth controlled buffer and an error-signal line is connected to an output of the second check-bit generator and to the second internal bus via the fifth controlled buffer, that the first and second check-bit generators are connected to a sixth controlled buffer linked to the disk controller by a check-bit line, and that the interface controller is connected to the controlled buffers by internal control-signal lines.

2. An interface device as claimed in claim 1, characterized in that the first control-signal lines comprise a write-enable-signal line, a read-enable-signal line, a first select-signal line, an interrupt-signal line, a first request-signal line, and a first reset-signal line.

3. An interface device as claimed in claim 1, characterized in that the second control-signal lines consist of a second select-signal line, a second reset-signal line, and an acknowledge-signal line, that the third control-signal lines consist of a busy-signal line and a command-acknowledge-signal line, and that the fourth control-signal lines contain an input/output signal line, a command/data signal line, and a second request signal line.

4. An interface device as claimed in claim 1, characterized in that a seventh controllable buffer is connected to a fixed potential and to the least significant bit line of the first internal bus and is so controlled over an additional internal-control-signal line that the least significant bit line is at a logic level representing the fixed potential.

5. An interface device as claimed in claim 1, characterized in that the interface controller comprises a command decoder, a select logic, an interrupt and DMA controller, and a control logic which are interconnected by command lines.

6. An interface device as claimed in claim 2, characterized in that the address bus and the first select-signal line are connected to the command decoder, that according to the addresses transferred from the host computer over the address bus into the command decoder, commands decoded by the command decoder are transferred out over a first command line, a second command line, a third command line, a fourth command line, and a fifth command line to a select logic, over a sixth command line both to the select logic and to a control logic, and over a seventh command line and to an eighth command line both to the select logic and to an interrupt and DMA controller, the sixth command line and the seventh command line also forming two of the internal control-signal lines and being connected to the fifth controller buffer and the second controllable buffer, respectively.

7. An interface device as claimed in claim 5, characterized in that the address bus and the first select-signal line are connected to the command decoder, that according to the addresses transferred from the host computer over the address bus into the command decoder, decoded commands are transferred out over a first command line, a second command line, a third command line, a fourth command line, and a fifth command line to the select logic, over a sixth command line both to the select logic and to the control logic, and over a seventh command line and an eighth command line both to the select logic and to the interrupt and DMA controller, the sixth command line and the seventh command line also forming two of the internal control-signal lines and being connected to the fifth controllable buffer and the second controllable buffer, respectively.

8. An interface device as claimed in claim 3, characterized in that a select logic is connected to a first reset-signal line, to a second reset-signal line, and to the second select-signal line, that an output of a select logic is coupled back to an input of the select logic via a ninth command line, and that a tenth command line connects the select logic both to a control logic and-as an additional internal control - signal line - to a seventh controlled buffer.

9. An interface device as claimed in claim 4, characterized in that a select logic is connected to a first reset-signal line, to a second reset-signal line, and to a second select-signal line, that an output of the select logic is coupled back to an input of the select logic via a ninth command line, and that a tenth command line connects the select logic both to the control logic and—as an additional internal control-signal line—to the seventh controlled buffer.

10. An interface device as claimed in claim 6, characterized in that the select logic is connected to a first reset-signal line, to a second reset-signal line, and to the second select-signal line, that an output of the select logic is coupled back to an input of the select logic via a ninth command line, and that a tenth command line connects the select logic both to the control logic and - as an additional internal control-signal line - to a seventh controlled buffer.

11. An interface device as claimed in claim 7, characterized in that the interrupt and DMA controller is connected to a first request-signal line, a interrupt signal line, a first reset-signal line, a second request-signal line, a input/output signal line, a command/data signal line, and the error-signal line.

12. An interface device as claimed in claim 8, characterized in that an output of the control logic is coupled back to an input of the control logic via an eleventh command line, that the control logic is connected to an interrupt and DMA controller by a twelfth command line and a thirteenth command line, that a write-enable-signal line and a read-enable-signal line are connected to a control logic, and that the eleventh command line and first, second, third, fourth, and fifth logic-signal lines connected to the outputs of the control logic form six of the internal control-signal lines.

13. An interface device as claimed in claim 3, characterized in that the first reset-signal line, the first command line, and an internal reset circuit are connected via a logic gate to the select logic such that respective reset signals on the first resetsignal line, on the first command line and from the internal reset circuit, are applied to the select logic one at a time.

14. An interface device as claimed in claim 5, characterized in that the first reset-signal line, the first command line, and an internal reset circuit are connected via a logic gate to the select logic such that respective reset signals on the first resetsignal line, on the first command line and from the internal reset circuit, are applied to the select logic one at a time.

15. An interface device as claimed in claim 6, characterized in that the first reset-signal line, the first command line, and an internal reset circuit are connected via a logic gate to the select logic such that respective reset signals on the first resetsignal line, on the first command line and from the internal reset circuit, are applied to the select logic one at a time.

* * * * *